United States Patent
Benear et al.

(10) Patent No.: US 6,504,995 B1
(45) Date of Patent: Jan. 7, 2003

(54) APPARATUS AND METHOD FOR STORING COMPRESSED DATA TO A STORAGE DEVICE

(75) Inventors: Richard Benear, Boise, ID (US); Randall Don Briggs, Boise, ID (US); Gregory A. Vaughn, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/358,800

(22) Filed: Jul. 21, 1999

(51) Int. Cl.[7] .............................................. H40N 5/917
(52) U.S. Cl. ...................................... 386/111; 386/125
(58) Field of Search ..................... 386/33, 45, 111–112, 386/125–126, 106; 360/8; 369/59.13, 59.23

(56) References Cited

U.S. PATENT DOCUMENTS

| | | | | |
|---|---|---|---|---|
| 5,835,667 A | * | 11/1998 | Wactlar et al. | 386/106 |
| 5,835,691 A | * | 11/1998 | Matsunoshita | 358/426 |
| 6,065,094 A | * | 5/2000 | Akiyama | 711/111 |
| 6,115,341 A | * | 9/2000 | Hirai | 369/59.13 |

* cited by examiner

Primary Examiner—Thai Tran
Assistant Examiner—Christopher Onuaku
(74) Attorney, Agent, or Firm—Matthew L. Wade

(57) ABSTRACT

Apparatus for writing compressed data to a storage device having multiple storage areas. The apparatus identifies one or more storage areas to receive the compressed data based upon the compression ratio of the compressed data and the characteristic transfer rates of the storage areas. The apparatus then writes the compressed data to the Identified storage areas. This is accomplished so that when the compressed data is later read, the storage device has at least a minimum output rate. The storage device may, for example, be a disk storage unit for a laser printer. The compressed data may be compressed video data describing a document to be printed.

12 Claims, 5 Drawing Sheets

APPARATUS AND METHOD FOR STORING COMPRESSED DATA TO A STORAGE DEVICE

FIELD OF THE INVENTION

The present invention relates generally to the storage of compressed data to a storage device.

BACKGROUND OF THE INVENTION

For purposes of this application, the phrase "mopy printer" refers to any laser printer (e.g., network printer, copier or facsimile machine) that can print one or more copies of a document from compressed video data stored in a local disk drive unit. The actual operation of printing from the hard disk drive is referred to herein as a "disk-print operation". In addition, the rate at which the compressed video data can be read from the disk drive is referred to herein as the "disk output rate".

Typically, a mopy printer performs a disk-print operation by use of a data pipeline. The data pipeline includes at least a disk drive unit, a data decompressor and a print engine. During a disk-print operation, compressed video data stored in the disk drive unit is transmitted by the disk drive unit to the input buffer of the decompressor. As the compressed data is received, the decompressor operates to decompress it and to transmit the resulting decompressed video data to the input buffer of the print engine. As the print engine receives the decompressed video data, the print engine prints the document.

Importantly, during a disk-print operation it is often desirable for the disk drive unit in the data pipeline to have a disk output rate above some minimum rate. This minimum rate is referred to herein as the "minimum disk output rate". If the disk drive unit in the pipeline is not able to transmit compressed video data at the minimum disk output rate, then the data pipeline is not able to process the data at an adequate rate (i.e., the pipeline is not able to run at "full speed"). This can result in reduced printing speed or in causing a print underrun condition. In the case of a print underrun condition, video data is not transmitted to the print engine at the required rate and the document currently being printed is not properly printed.

In the prior art, the actual disk output rate during a disk-print operation is often unpredictable and may not be above the minimum disk output rate required for the pipeline to run at full speed. As indicated above, this can result in an undesirable reduction of printing speed or the occurrence of a print underrun condition or both.

Accordingly, there is a need for a way to ensure that a disk drive unit in a mopy printer has an disk output rate above the minimum disk output rate during a disk-print operation.

SUMMARY OF THE INVENTION

The present invention is directed to satisfying the need to ensure that a storage device, such as a disk drive unit in a mopy printer, is able to transmit compressed data at a minimum disk output rate. The minimum disk output rate being a function of the compression ratio of the compressed data being transmitted.

In one embodiment of the invention, apparatus is provided for writing compressed data to a storage device. The storage device having a plurality of storage areas each having a characteristic transfer rate. The storage device has at least a minimum disk output rate if the compressed data is stored in a storage area having a characteristic transfer rate above a minimum transfer rate. The minimum transfer rate being a function of the compression ratio of the compressed data. The apparatus includes means for using the compression ratio to identify at least one storage area from the plurality of storage areas. The at least one storage area has a characteristic transfer rate above the minimum transfer rate. The apparatus further includes means for writing the compressed data to the at least one storage area.

The storage device may be, for example, be a disk drive unit that includes a disk storage media. The disk storage media may include a set of tracks each having a characteristic transfer rate above the minimum transfer rate. The at least one storage area identified by the identifying means includes a track from the set having the lowest characteristic transfer rate.

In another embodiment, a computing system is provided comprising a storage device and a controller coupled to the storage device. The storage device includes a plurality of storage areas for storing and transmitting compressed data. The controller is operable to identify at least one of the storage areas to receive the compressed data based upon a compression ratio of the compressed data and is further operable to write the compressed data to the at least one storage area. The storage device having at least a minimum disk output rate when transferring data from the at least one storage area and the minimum disk output rate being a function of a compression ratio of the compressed data. The compressed data may be compressed video data and the computing system may be a mopy printer.

In yet another embodiment a method of writing a compressed data to a storage device is provided. The storage device having a plurality of storage areas and having at least a minimum disk output rate when transferring data from at least one of the plurality of storage areas and wherein the minimum disk output rate being a function of a compression ratio of the compressed data. The method includes identifying the at least one storage area from said plurality of storage areas based upon said compression ratio, and writing the compressed data to said at least one storage area. The storage device may include a disk storage media and the at least one storage areas may include a track on the at least one disk storage media. The disk storage media may include a plurality of tracks each of which having a characteristic transfer rate and wherein the storage device having at least a minimum disk output rate when transferring data from each of said plurality of tracks and wherein the track being a track from said plurality of tracks having the lowest characteristic transfer rate.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
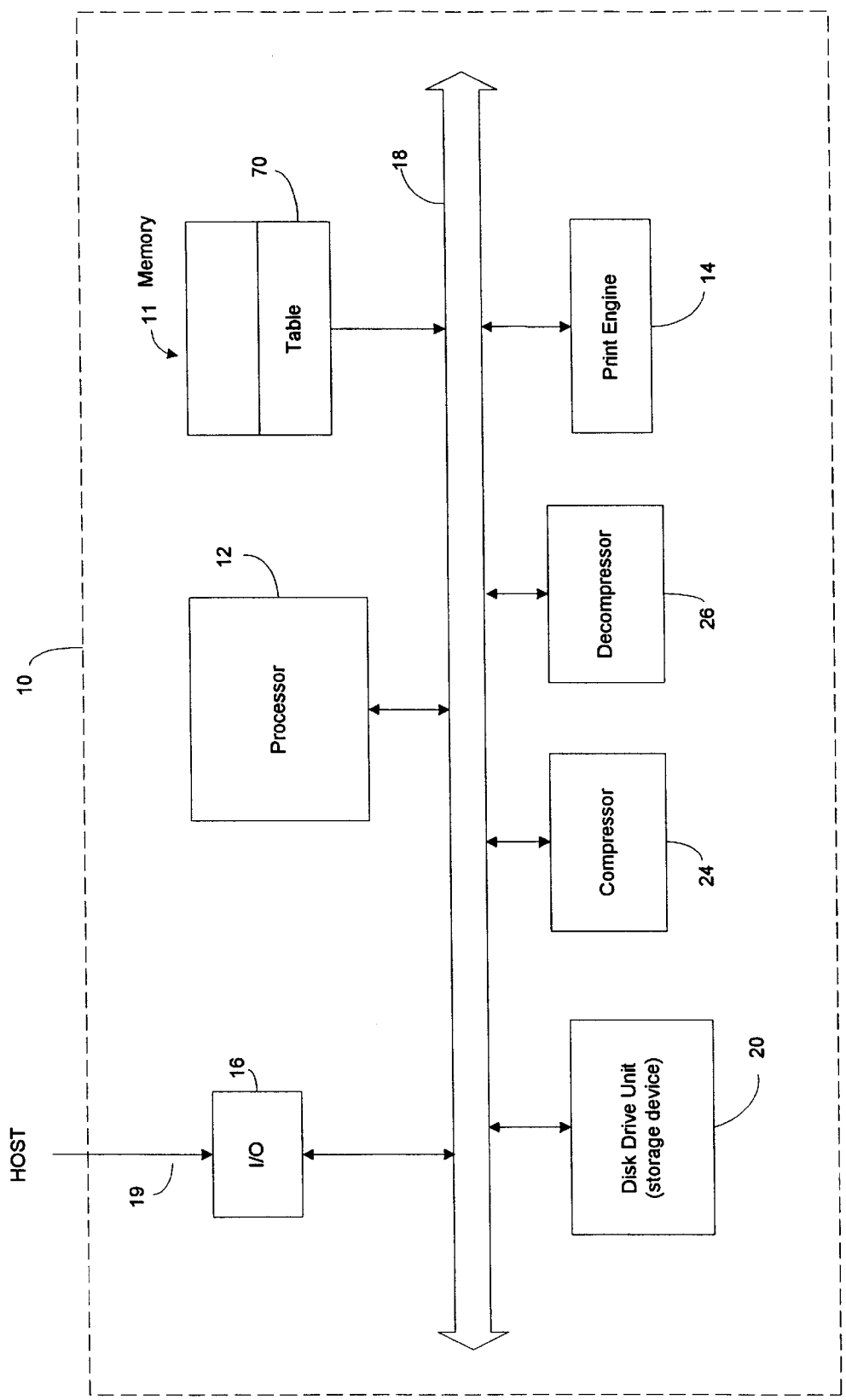
FIG. 1 is a high level circuit block diagram of a mopy printer incorporating an embodiment of the invention.

To illustrate an example of the present invention, FIG. 1 provides a high level circuit block diagram of a mopy printer 10. As shown, the printer 10 includes an Input/Output (I/O) port 16, a processor 12, a memory 11, a disk drive unit 20, a video data compressor (compressor) 24, a video data decompressor (decompressor) 26 and a print engine 14 all connected via a bus 18.

The I/O port 16 provides the printer 10 with the ability to receive print jobs from a host computer over the communication link 19. The processor 12 provides the printer 10 with control and image processing functionality under the direction of software routines stored in the memory 11. Memory 11 may, for example, include read only memory (ROM) and random access memory (RAM). The compressor 24 provides printer 10 with data compression capability. The decompressor 26 provides printer 10 with data decompression capability. It is noted that both the compressor 24 and the decompressor 26 may be implemented by one or more microprocessors running under the direction of software programs or by combinatorial logic circuits or by a combination of software and logic circuits. The print engine 14 is a laser print engine and is designed to receive video data at a constant rate.

Figure 2:
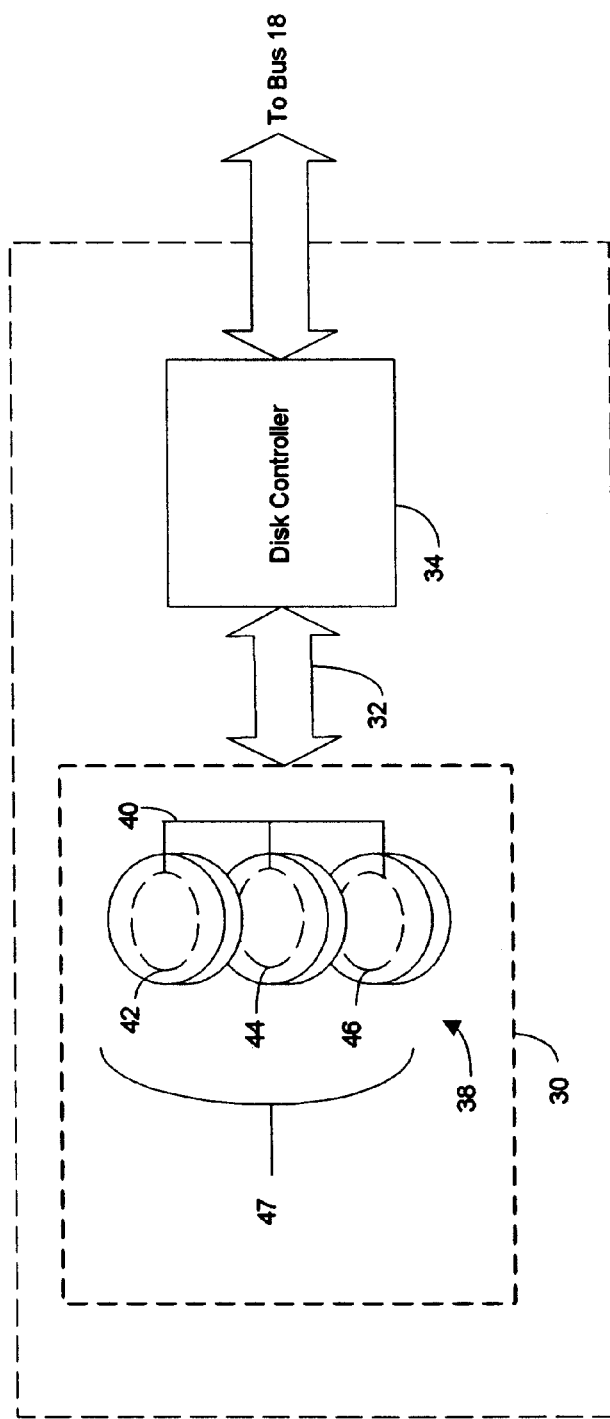
FIG. 2 provides a high level diagram of a disk drive unit in the printer.

FIG. 2 provides a high level diagram of the disk drive unit 20. As shown, the disk drive unit 20 includes standard components including a set of magnetic disk storage media 38 and a read/write head and actuator system (heads) 40 which are both depicted, in an abstract form, within box 30. In addition, the disk drive unit 20 includes a disk controller 34 which is coupled to the heads 40 via a communication link 32. The controller 34 is also coupled, as shown, to the bus 18.

The set of storage media 38 includes a number of storage areas for storing data. These storage areas are commonly referred to as cylinders. Each cylinder consists of one or more tracks on the disk storage media 38. For example, a cylinder 47 includes a track 42, a track 44 and a track 46.

As understood by a person skilled in the art, each cylinder in the disk storage unit 20 has a "characteristic data transfer rate" which is the rate at which data can be transferred from each track in the cylinder. A cylinder having a large diameter typically has a higher characteristic transfer rate, as well as a greater storage capacity, than a smaller diameter cylinder. Importantly, during a read operation, the disk output rate of the disk drive unit 20 is directly related to the characteristic transfer rate of the cylinder transferring the data. The higher the characteristic transfer rate of the cylinder transferring the data, the higher the disk output rate.

To illustrate further the invention, the operation of the printer 10 is now described upon receiving a print job over the I/O port 16 from an external host computer. The print job is assumed to include print data that describes a document and a command that indicates more than one copy of the document is to be printed. When such a print job is received, the processor 12 operates to convert the print data in the print job into video data using standard techniques. A copy of the video data is then transmitted to the print engine 14. The print engine 14 receives the video data and prints the first copy of the document. In addition to transmitting a copy of the video data to the print engine 14, the video data is also transmitted to the compressor 24 for compression. Upon receiving the video data, compressor 24 operates to execute one or more compression algorithms to convert the video data into a compressed form. The compressor 24 then operates, according to the principles of the present invention, to write the compressed video data to the disk drive unit 20. This operation is explained in greater detail below.

After the compressed video data is written to the disk drive unit 20 and the first document copy printed, the printer 10 then operates to perform a disk-print operation to print the rest of the desired document copies. To illustrate further the disk-print operation, reference is made to FIG. 3.

Figure 3:
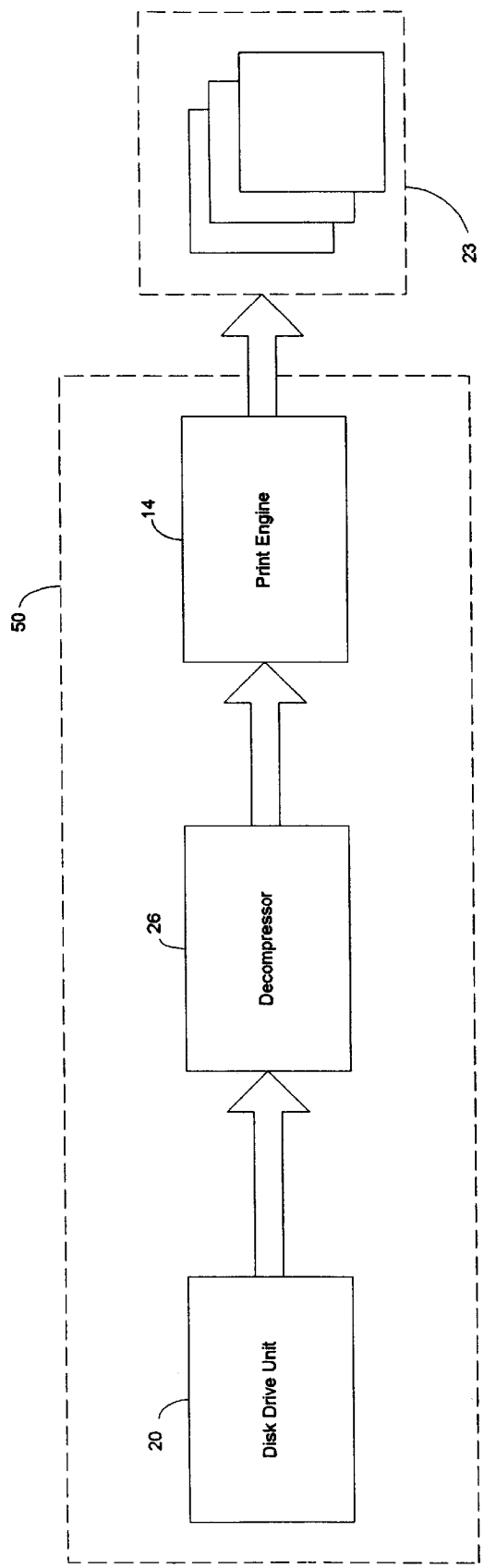
FIG. 3 is a data flow diagram illustrating a data pipeline during a disk-print operation.

FIG. 3 is a data flow diagram illustrating the data pipeline 50 during a disk-print operation. As shown, the data pipeline 50 includes the disk drive unit 20, the decompressor 26 and the print engine 14. During a disk-print operation, the compressed video data is read from the disk drive unit 20 and transferred to the input buffer of the decompressor 26. As the compressed video data is received, the decompressor 26 operates to decompress the video data using one or more decompression algorithms. As the video data is decompressed, the decompressed video data is transmitted to print engine 14.

Assuming the print engine 14 receives the video data at an adequate rate, print engine 14 operates to print the next copy of the document (e.g., document 23). This operation continues for each document copy that is to be printed.

During the disk-print operation, it is desirable for the disk drive unit to have at least a minimum disk output rate in order for the data pipeline 50 to run at full speed. If the disk drive unit 20 is not able to transmit the data at the minimum disk output rate, the document copies are not printed at the desired rate or a print underrun condition may occur.

It is important to note for the later discussion that the minimum disk output rate required for the pipeline 50 to run at full speed is a function of the compression ratio of the compressed video data being printed. This is understood when it is considered that the higher the compression ratio, the more video data the decompressor 26 is able to generate from a given transfer of compressed video data. For example, the decompressor 26 can, on average, generate twice as much video data from each byte of compressed video data received at a 4:1 compression ratio as compared to compressed video data received at a 2:1 compression ratio.

As previously mentioned, the compressor 24 operates to write, according to the principles of the present invention, the compressed video to the disk drive unit 20. This operation is now explained in detail with reference to FIGS. 1–4 and in light of the above discussion.

In the present embodiment, the relationship between the compression ratio of the compressed video data being used for printing and the minimum disk output rate for the pipeline 50 to run at full speed have been quantified to the extent required to assign a compression ratio to each cylinder in the disk drive unit 50. This information is stored in the form of a table 70 in the memory 11.

Assume, for example, a particular cylinder is assigned a minimum compression ratio of 4:1. If the compressed video data is stored in this cylinder and the data has a compression ratio above 4:1, then it is known that the disk drive unit 20 will be able to transmit the data at least at the minimum disk output rate required for the pipeline 50 to run at full speed during a disk-print operation.

As indicated above, the characteristic transfer rate of a track is a function of the tracks diameter. Thus, smaller diameter cylinders (consisting of smaller diameter tracks) are assigned relatively high minimum compression ratios in the table 70. Larger diameter cylinders are assigned relatively low minimum compression ratios.

Figure 4:
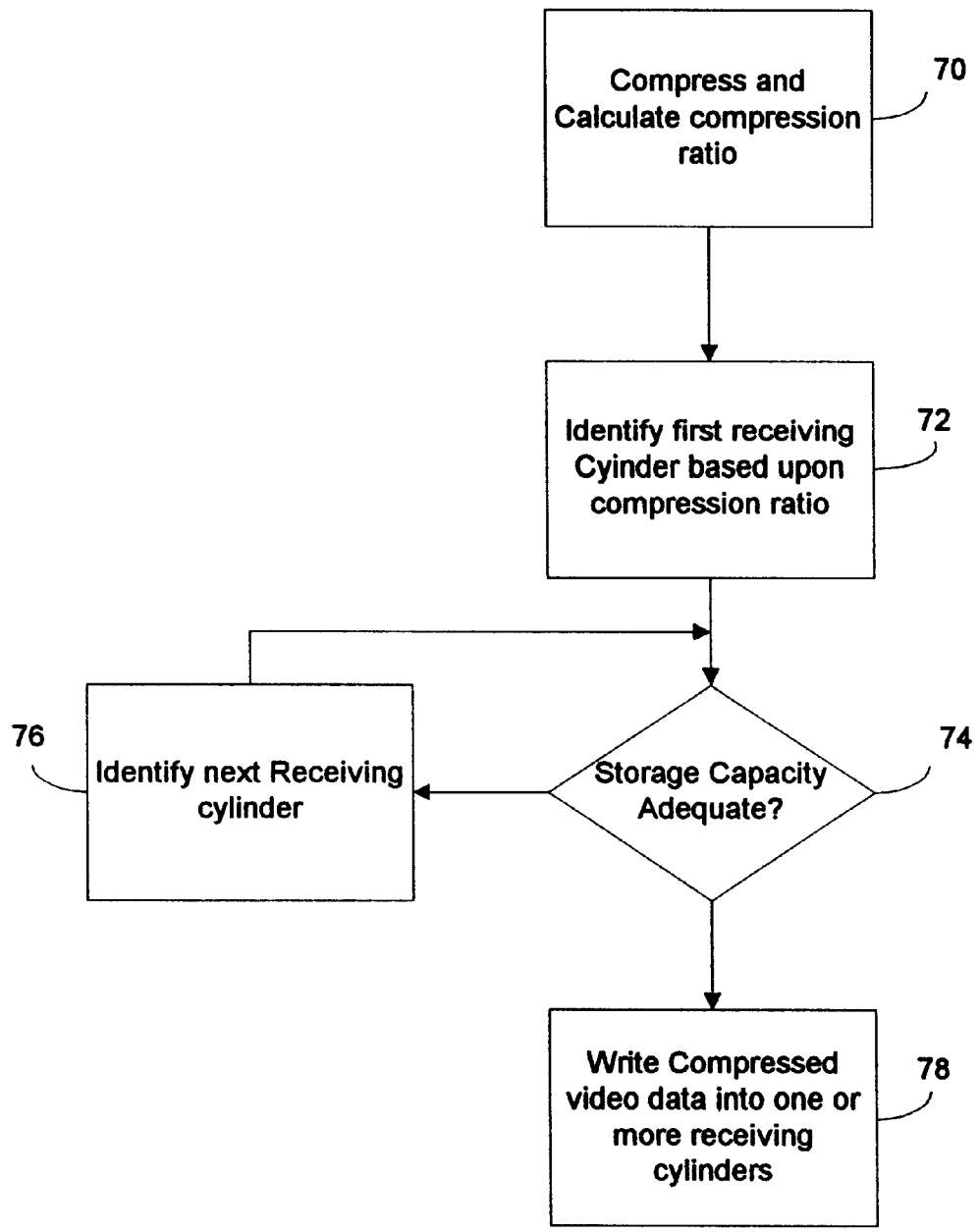
FIG. 4 is a flow diagram illustrating the steps performed to write the compressed video data to the disk drive unit.

FIG. 4 is a flow diagram illustrating the steps the compressor 24 performs to write the compressed video data to the disk drive unit 20. Referring now to FIG. 4, the compressor 24 first compresses the video data and calculates the compression ratio (step 70). Next, the compressor 24 operates to use the compression ratio to identify a cylinder in the disk drive unit 20 (step 72) to receive the compressed video data. This is accomplished, in part, by compressor 24 accessing the table 70. For ease of discussion the cylinder identified in step 72 is referred to herein as the "first receiving cylinder".

Importantly, the first receiving cylinder is a cylinder in the disk drive unit 20 that meets at least the following two criteria. First, the cylinder must be available to receive data. Second, the cylinder must have been assigned a compression ratio that is at, or below, the compression ratio of the compressed video data that is to be stored. Many cylinders in the disk dive unit will meet the two criteria just mentioned. Preferably, the cylinder chosen as 20 the first receiving cylinder is the one that has the lowest characteristic transfer rate that still meets the two criteria just mentioned. As indicated above, this cylinder will also correspond to the cylinder having the smallest diameter and storage capacity from the group.

To further illustrate step 72, assume that there are only four available cylinders in the disk drive unit 20. These cylinders are listed in table 1.

TABLE 1

| Cylinder | Assigned Compression Ratio | Characteristic Transfer Rate |
| --- | --- | --- |
| Cylinder A | 8:1 | 10 Mbytes/Sec |
| Cylinder B | 6:1 | 20 Mbytes/Sec |
| Cylinder C | 4:1 | 30 Mbytes/Sec |
| Cylinder D | 2:1 | 40 Mbytes/Sec |

Also, assume that the compression ratio calculated in step 70 is 5:1. In this case it can be seen that cylinder C and cylinder D meet the two criteria mentioned above. That is, cylinder C and cylinder D both are available to receive data and are assigned compression ratios at or below the compression ratio of the compressed data that is to be stored (i.e., 5:1). Also, between cylinder C and cylinder D, cylinder C has the lowest characteristic transfer rate. Thus, in the preferred embodiment, the compressor 24 operates to identify cylinder C as the "first receiving cylinder".

After identifying the first receiving cylinder, the processor 12 then determines if the storage capacity of the cylinder is adequate (iterative step 74). If not, then the next largest diameter cylinder is identified (iterative step 76). These iterative steps continue until enough cylinders have been identified that collectively have the required storage capacity to receive the compressed video data. The compressed video data is then written to these cylinders (step 78).

It can be seen that by using the procedure just described to write the compressed video data to the disk drive unit 20, a number of advantages are achieved. For example, during a disk print operation, the disk drive unit 20 will have at least the minimum disk output rate in order for the pipeline 50 to run at full speed. Thus, the documents are printed at the desired rate and print underrun conditions are avoided.

In addition, by writing the compressed video data into cylinders having the lowest acceptable transfer rates, the cylinders having higher transfer rates are reserved. These higher transfer rate cylinders can then be used to store compressed video data having lower compression ratios from subsequently received print jobs. Thus, in this manner, the present invention effectively increases the capacity of the disk drive unit 20 to store compressed video data from multiple print jobs while ensuring that the data flow requirements are met during a disk-print operation.

Figure 5:
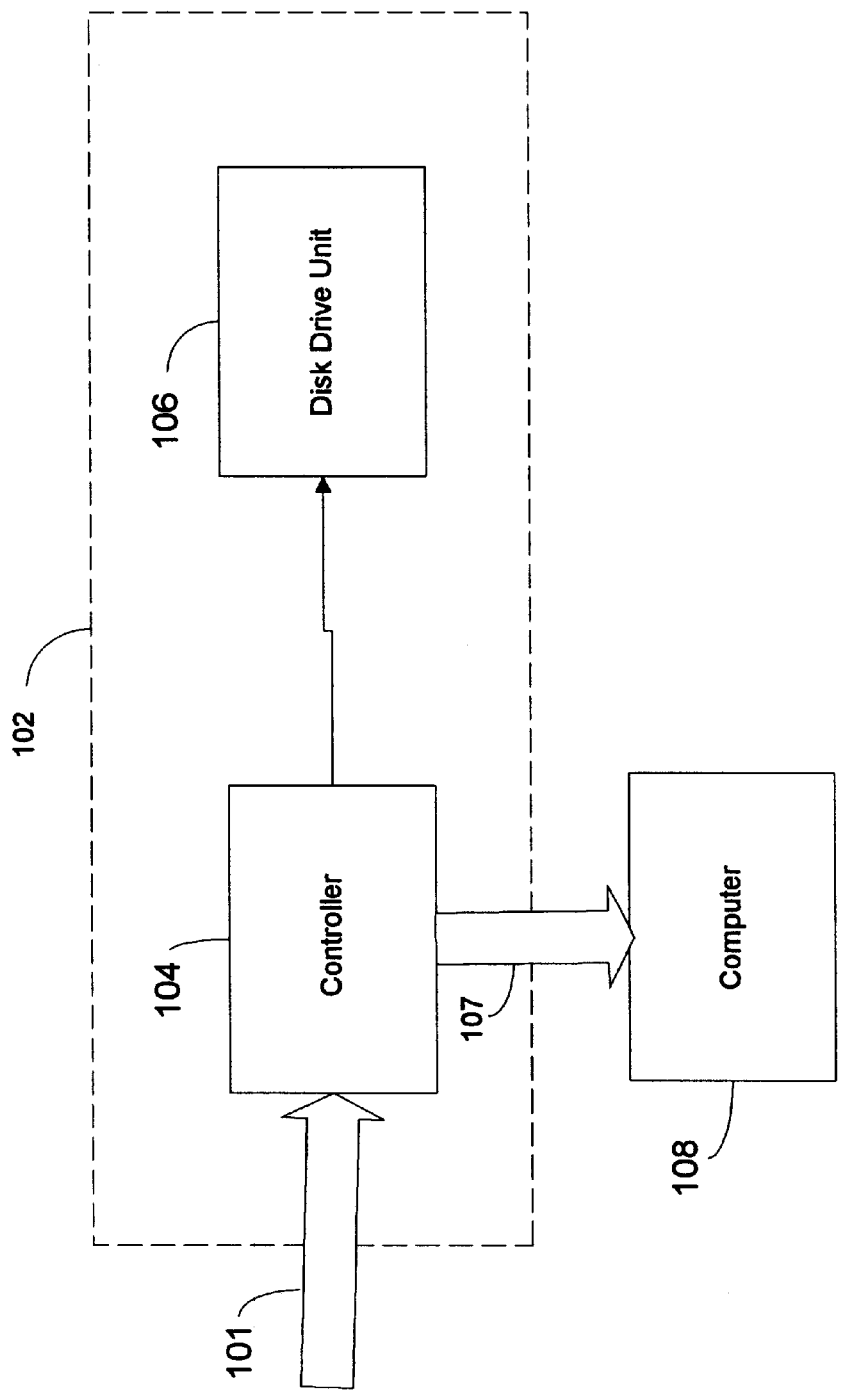
FIG. 5 illustrates a storage device incorporating another embodiment of the invention.

It is noted that the present invention may also be used to improve other types of data handling devices. To illustrate this, consider a second embodiment of the present invention in the form of storage device 102 depicted in FIG. 5. As shown, the storage device 102 includes a controller 104 and a disk drive unit 106. The disk drive unit 106 is assumed to have multiple cylinders. Each of these cylinders has a characteristic transfer rate.

In general, controller 104 is used to receive compressed data files over communication link 101 and to then store these files into the disk drive unit 106. The controller 104 can then perform a read operation upon disk drive 106 in order to read one or more of the stored files. As the controller 104 reads a file, the file data is transmitted over communication link 107 to, for example, computer 108. Communication link 107 could be, for example, the INTERNET and computer 108 may be a personal computer. The compressed data files may be, for example, be compressed audio data or compressed video data or a combination of both.

In this embodiment, it is assumed that when a compressed data file is read from disk drive 106, it is desirable for disk drive 106 to have at least a minimum disk output rate. This is required in order for the file data to be transmitted over communication link 107 at the desired rate.

In this embodiment, the capacity of storage device 102 to read and to then transmit compressed data files at various compression ratios has been studied to the extent required to assign a minimum compression ratio to each cylinder in disk drive 106. If the compression ratio of the compressed file being read is above the minimum compression ratio assigned to the cylinder transferring the compressed file, then it is known that the disk drive unit 106 will have at least the minimum disk output rate.

The operation of the controller 104 to store a compressed data file begins upon it receiving a compressed data file over the communication link 101. After the compressed data file is received, the compression ratio of the compressed data file is then determined. The controller 104 then operates to write the compressed data file to the disk drive unit 106 based upon the compression ratio. This is accomplished by only writing the compressed data file to those cylinders that are assigned a minimum compression ratio at or below the compression ratio of the compressed data file. As in the first embodiment, typically a group number of cylinders will be assigned minimum compression ratios at or below the compression ratio of the compressed data file. Preferably, the controller 104 operates to write the compressed data file to the one or more cylinders from this group that having the lowest storage capacity. Thus, cylinders having greater storage capacity are reserved for compressed files that are later received that may need the additional capacity.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for writing compressed data to a storage device having a plurality of storage areas, the apparatus comprising:

(a) means for identifying the storage area having a lowest characteristic transfer rate (CTR) from those members of the plurality of storage areas that have a CTR which exceed a minimum transfer rate (MTR);

(b) means for writing at least a portion of the compressed data to the identified storage area; and wherein each storage area from the plurality has a different CTR;

wherein a first subset of the storage areas each have a CTR below the MTR and a second subset of the storage areas each have a CTR above the MTR; and wherein the value of the MTR is dependant upon the compression ratio of the data.

2. The apparatus according to claim 1, wherein said storage device is a disk drive unit Including a disk storage media, and said at least one storage area Includes a track on said at least one disk storage media.

3. The apparatus according to claim 1, wherein said apparatus resides in a printer and said compressed data is compressed video data describing a document to be printed.

4. The apparatus according to claim 1, wherein said apparatus resides in a printer and said compressed data being compressed video data describing a document to be printed.

5. A computing system, comprising:

(a) a storage device including a plurality of storage areas each having a different CTR; and (b) a controller, coupled to said storage device, operable to identify a storage area from the plurality of storage areas to receive compressed data;

wherein the plurality of storage areas include a first subset of storage areas that have a CTR which exceed a minimum transfer rate (MTR);

wherein the plurality of storage areas include a second subset of storage areas that have a CTR that do not exceed the MTR;

wherein the controller Identifies the storage area from the first subset that has the lowest CTR;

wherein the value of the MTR is a function of the compression ratio of the data.

6. The computing system according to claim 5, wherein said compressed data includes compressed video data.

7. The computing system according to claim 6, further comprising:

(d) means for receiving said compressed video data transmitted from said storage device and for converting said compressed video data into a viewable form.

8. The computing system according to claim 7, wherein said storage device includes a disk storage media and said at least one storage area includes a track on said disk storage media.

9. A method of writing compressed data to a disk storage device having a plurality of storage areas: identifying a storage area from the plurality of storage areas to receive at least a portion of the compressed data, and (b) writing said compressed data portion to the identified storage area;

wherein the plurality of storage areas each have a different characteristic transfer rate (CTR);

wherein a first subset of the plurality of storage areas have a CTR that exceed a minimum transfer rate;

wherein a second subset of the plurality of storage areas have a CTR that do not exceed the MTR;

wherein step (a) is performed so as to identify the storage area from the first subset that has the lowest CTR:

wherein the value of the MTR is a function of the compression ratio of the data.

10. A method according to claim 9, wherein said storage device includes a disk storage media and said at least one storage areas includes a track on said at least one disk storage media.

11. A method according to claim 9, wherein said compressed data is compressed video data and said method is performed within a printer.

12. A method according to claim 9, wherein said storage device includes a disk drive unit and said at least one storage areas includes a cylinder in said disk drive unit.

* * * * *